United States Patent
Narahashi et al.

(10) Patent No.: US 9,337,990 B2
(45) Date of Patent: May 10, 2016

(54) FRONT-END CIRCUIT AND IMPEDANCE ADJUSTMENT METHOD

(71) Applicant: NTT DOCOMO, INC., Tokyo (JP)

(72) Inventors: Shoichi Narahashi, Tokyo (JP); Hiroshi Okazaki, Tokyo (JP); Kunihiro Kawai, Tokyo (JP); Yuta Takagi, Tokyo (JP); Takayuki Furuta, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 25 days.

(21) Appl. No.: 14/359,240

(22) PCT Filed: Jul. 9, 2013

(86) PCT No.: PCT/JP2013/068703
§ 371 (c)(1),
(2) Date: May 19, 2014

(87) PCT Pub. No.: WO2014/010575
PCT Pub. Date: Jan. 16, 2014

(65) Prior Publication Data
US 2014/0321312 A1 Oct. 30, 2014

(30) Foreign Application Priority Data

Jul. 11, 2012 (JP) ................................. 2012-155246

(51) Int. Cl.
*H04L 5/14* (2006.01)
*H04B 1/525* (2015.01)
(Continued)

(52) U.S. Cl.
CPC ............. *H04L 5/1461* (2013.01); *H04B 1/006* (2013.01); *H04B 1/525* (2013.01); *H04W 24/08* (2013.01)

(58) Field of Classification Search
CPC ....... H04B 1/525; H04B 1/006; H04W 24/08; H04L 5/1461
USPC ................................................. 370/242–252
See application file for complete search history.

(56) References Cited

U.S. PATENT DOCUMENTS

| 7,518,469 B2 * | 4/2009 | Kemmochi .......... H04B 1/0057 333/126 |
| 2004/0127182 A1 * | 7/2004 | Hayashi .................... H01P 1/15 455/193.1 |

(Continued)

FOREIGN PATENT DOCUMENTS

JP  2011 182271  9/2011

OTHER PUBLICATIONS

Extended European Search Report issued May 13, 2015 in Patent Application No. 13817551.8.
(Continued)

*Primary Examiner* — Bob Phunkulh
*Assistant Examiner* — Kyaw Z Soe
(74) *Attorney, Agent, or Firm* — Oblon, McClelland, Maier & Neustadt, L.L.P.

(57) ABSTRACT

A front-end circuit includes an RFIC, an antenna, N duplexers, N variable impedance adjustment circuits, a switch for selecting any two of the N variable impedance adjustment circuits, and a control unit which receives a control signal from the RFIC, where $2 \leq N$. The control unit executes switching operations of the N variable impedance adjustment circuits and the switch in accordance with control information. The control signal indicates to 1) control the switch to select two variable impedance adjustment circuits corresponding to a p-th frequency band and a q-th frequency band respectively, 2) control a variable impedance adjustment circuit corresponding to the p-th frequency band to increase input impedance in the q-th frequency band as viewed from the antenna side and 3) control a variable impedance adjustment circuit corresponding to the q-th frequency band to increase input impedance in the p-th frequency band as viewed from the side.

3 Claims, 9 Drawing Sheets

(51) Int. Cl.
*H04W 24/08* (2009.01)
*H04B 1/00* (2006.01)

(56) References Cited

U.S. PATENT DOCUMENTS

| | | | | |
|---|---|---|---|---|
| 2006/0063543 A1* | 3/2006 | Matoba | | H04L 1/0003 455/509 |
| 2007/0042802 A1* | 2/2007 | Park | | H04B 1/006 455/552.1 |
| 2010/0003979 A1* | 1/2010 | Iwamura | | H04L 1/0025 455/436 |
| 2010/0014429 A1* | 1/2010 | Kim | | H04W 24/00 370/241 |
| 2011/0298685 A1* | 12/2011 | Schmidhammer | | H01Q 9/0407 343/861 |
| 2012/0044026 A1* | 2/2012 | Fukuda | | H03F 3/19 333/33 |
| 2012/0163245 A1* | 6/2012 | Tone | | H04B 1/525 370/277 |

OTHER PUBLICATIONS

International Search Report Issued Aug. 6, 2013 in PCT/JP13/068703 Filed Jul. 9, 2013.

* cited by examiner

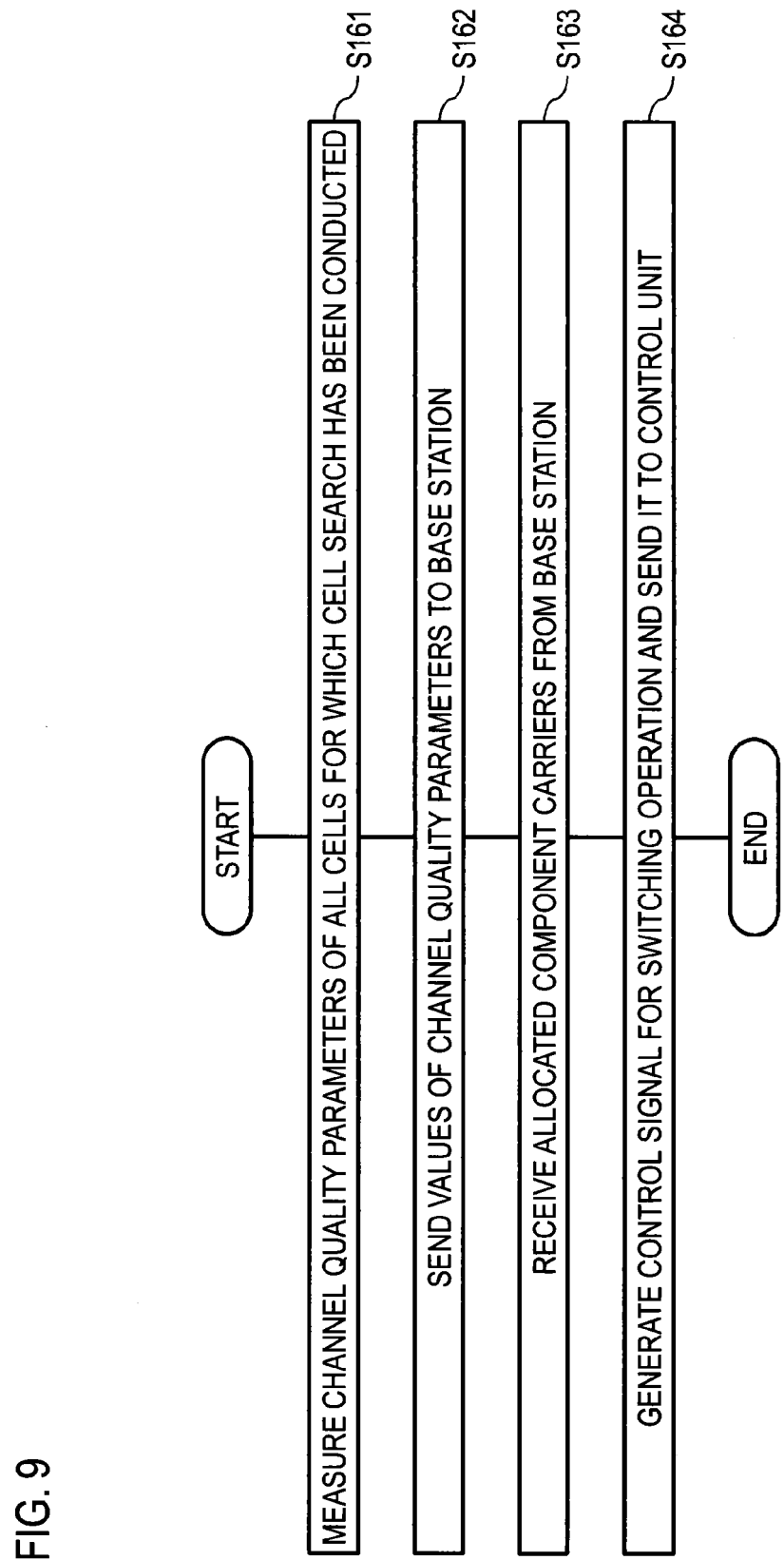

US 9,337,990 B2

FRONT-END CIRCUIT AND IMPEDANCE ADJUSTMENT METHOD

TECHNICAL FIELD

The present invention relates to a front-end circuit used in portable terminals and to an impedance adjustment method that adjusts impedance in the front-end circuit used in portable terminals.

BACKGROUND ART

Recently, LTE-Advanced has been standardized as an extended version of LTE (Long Term Evolution) standardized in the 3GPP Releases 8 and 9. The LTE-Advanced specifications include a carrier aggregation technique. Carrier aggregation is a technique of sending and receiving signals simultaneously by aggregating a plurality of carrier waves of band blocks divided in widths of 20 MHz, each carrier wave being called a component carrier. There are two types of carrier aggregation: intra-band carrier aggregation uses an aggregate of component carriers in the same frequency band for transmission and reception, and inter-band carrier aggregation uses an aggregate of component carriers in different frequency bands for transmission and reception.

When the component carriers of different frequency bands are sent or received simultaneously, the front-end circuit of the portable terminal requires a mechanism for modulating and demodulating the carrier waves of the different frequency bands simultaneously, as shown in FIG. 1, for example. FIG. 1 is a block diagram showing the configuration of a conventional front-end circuit 90 that enables transmission and reception in multiple bands (first to N-th frequency bands, N being an integer not smaller than 2). As shown in FIG. 1, the front-end circuit 90 includes a transmission and reception antenna 91, a double-pole N-throw switch 92 with its common contact connected to the transmission and reception antenna 91, duplexers 93-1 to 93-N which receive the transmission and reception signals in the first to N-th frequency bands, with their common contacts connected respectively to the N changeover contacts of the switch 92, low-noise amplifiers 94-1 to 94-N which are connected to the reception terminals of the duplexers 93-1 to 93-N and amplify the reception signals in the first to N-th frequency bands, amplifiers 95-1 to 95-N which are connected to the transmission terminals of the duplexers 93-1 to 93-N and amplify the transmission signals in the first to N-th frequency bands, and an RFIC 96 which has transmission ports Tx1 to TxN for the first to N-th frequency bands and reception ports Rx1 to RxN for the first to N-th frequency bands. Since two frequency bands, namely, a primary component carrier and a secondary component carrier, allocated by a base station are used simultaneously, the switch 92 can connect two duplexers corresponding to the allocated component carriers and the transmission and reception antenna 91. For example, patent literature 1 discloses a front-end circuit which implements multiband transmission and reception.

PRIOR ART LITERATURE

Patent Literature

Patent literature 1: Japanese Patent Application Laid Open No. 2011-182271

SUMMARY OF THE INVENTION

Problems to be Solved by the Invention

Examples in which component carriers of different pairs of frequency bands, namely, UMTS bands 1 and 3 and UMTS bands 1 and 8, are allocated in FIG. 1 will be described with reference to FIG. 2. FIG. 2 is a view showing an example of frequency allocation when carrier aggregation is executed with the conventional front-end circuit 90 shown in FIG. 1. In the example shown in FIG. 2, the $n_1$-th frequency ($n_1$ is an integer satisfying $1 \leq n_1 \leq N$) is always in the UMTS band 1, and the $n_2$-th frequency ($n_2$ is an integer satisfying $1 \leq n_2 \leq N$ and $n_1 \neq n_2$) is either in the UMTS band 3 or in the UMTS band 8. In the example shown in FIG. 2, the duplexer 93-$n_2$ is an ideal duplexer that passes a signal in a desired band without loss and blocks a signal in the other bands (input impedance of the common terminal is infinite), and the switch 92 is an ideal switch. The transmission characteristics of the duplexers 93-$n_1$ and 93-$n_2$ will be described with reference to FIGS. 3A to 3C. FIGS. 3A to 3C are views showing the results of simulation of the transmission characteristics of the duplexers in the front-end circuit 90 in carrier aggregation. FIG. 3A is a Smith chart showing the simulated reflection characteristics of the duplexer 93-$n_1$, in which impedance normalized to 50 ohms is set to 1 on the horizontal axis. FIG. 3B is a graph showing the simulated transmission characteristics of the duplexers 93-$n_1$ and 93-$n_2$ (UMTS band 3), with the horizontal axis representing frequency (GHz) and the vertical axis representing the S parameter. FIG. 3C is a graph showing the simulated transmission characteristics of the duplexers 93-$n_1$ and 93-$n_2$ (UMTS band 8), with the horizontal axis representing frequency (GHz) and the vertical axis representing the S parameter. In FIGS. 3B and 3C, the solid line connecting square points represents the transmission characteristics of the transmission filter of the duplexer 93-$n_1$, the solid line connecting triangular points represents the transmission characteristics of the reception filter of the duplexer 93-$n_1$, the dotted line represents the transmission characteristics of the transmission filter of the duplexer 93-$n_2$, and the dashed line represents the transmission characteristics of the reception filter of the duplexer 93-$n_2$. If the $n_2$-th frequency is in the UMTS band 3, the duplexer 93-$n_2$ (UMTS band 3) exhibits favorable transmission characteristics with low loss, as represented by the dotted line and the dashed line in FIG. 3B. The reason is that the input impedance of the duplexer 93-$n_1$ as viewed from the antenna side is high in the frequency band (around 1.7 GHz) near the UMTS band 3, which adequately prevents the transmission and reception signals in the UMTS band 3 from leaking into the duplexer 93-$n_1$, as shown in FIG. 3A. If the $n_2$-th frequency is in the UMTS band 8, the transmission characteristics of the duplexer 93-$n_2$ (UMTS band 8) indicate large loss, as represented by the dotted line and the dashed line in FIG. 3C. The reason is that the input impedance of the duplexer 93-$n_1$ as viewed from the antenna side is low in the frequency band (around 1.0 GHz) near the UMTS band 8, which allows the transmission and reception signals in the UMTS band 8 to leak into the duplexer 93-$n_1$. In carrier aggregation, a signal can leak from a duplexer of a different circuit, increasing the insertion loss, depending on the combination of the component carriers, and the leakage becomes a problem in implementation of the front-end circuit. An object of the present invention is to provide a front-end circuit that can prevent a signal from leaking into a different circuit even when signals are sent and received simultaneously on multiple frequency bands in carrier aggregation.

Means to Solve the Problems

A front-end circuit of the present invention includes a transmission and reception antenna, a double-pole N-throw switch (N is an integer larger than or equal to 2) which has a common contact connected to the transmission and reception antenna, N variable impedance adjustment circuits each having a terminal on the antenna side and a terminal on the RFIC side, the terminals on the antenna side being connected respectively to N changeover contacts of the switch, N duplexers each having a common terminal, for receiving transmission and reception signals in the first to N-th frequency bands, the common terminals being respectively connected to the terminals on the RFIC side of the N variable impedance adjustment circuits, a control unit connected to the N variable impedance adjustment circuits and the switch by control lines, for controlling switching operations of the N variable impedance adjustment circuits and the switch through the control lines, and an RFIC for sending a control signal to the control unit.

Effects of the Invention

A front-end circuit according to the present invention can prevent a signal from leaking into another circuit even when signals are transmitted and received simultaneously in a plurality of frequency bands in carrier aggregation.

BRIEF DESCRIPTION OF THE DRAWINGS

FIGS. 3A to 3C are views showing the results of simulation of transmission characteristics of duplexers in carrier aggregation with the conventional front-end circuit, in which FIG. 3A is a Smith chart showing the simulated reflection characteristics of a duplexer, FIG. 3B is a graph showing the simulated transmission characteristics of the duplexer and a duplexer (UMTS band 3), and FIG. 3C is a graph showing the simulated transmission characteristics of the duplexer and the duplexer (UMTS band 8);

FIGS. 5A and 5B are views showing the results of simulation of transmission characteristics of duplexers in carrier aggregation with the improved front-end circuit, in which FIG. 5A is a Smith chart showing the simulated reflection characteristics of a duplexer, and FIG. 5B is a graph showing the simulated transmission characteristics of a duplexer (UMTS band 8);

FIG. 9 is a flowchart illustrating the operation of the control system provided in the RFIC in the first embodiment.

DETAILED DESCRIPTION OF THE EMBODIMENTS

Figure 1:
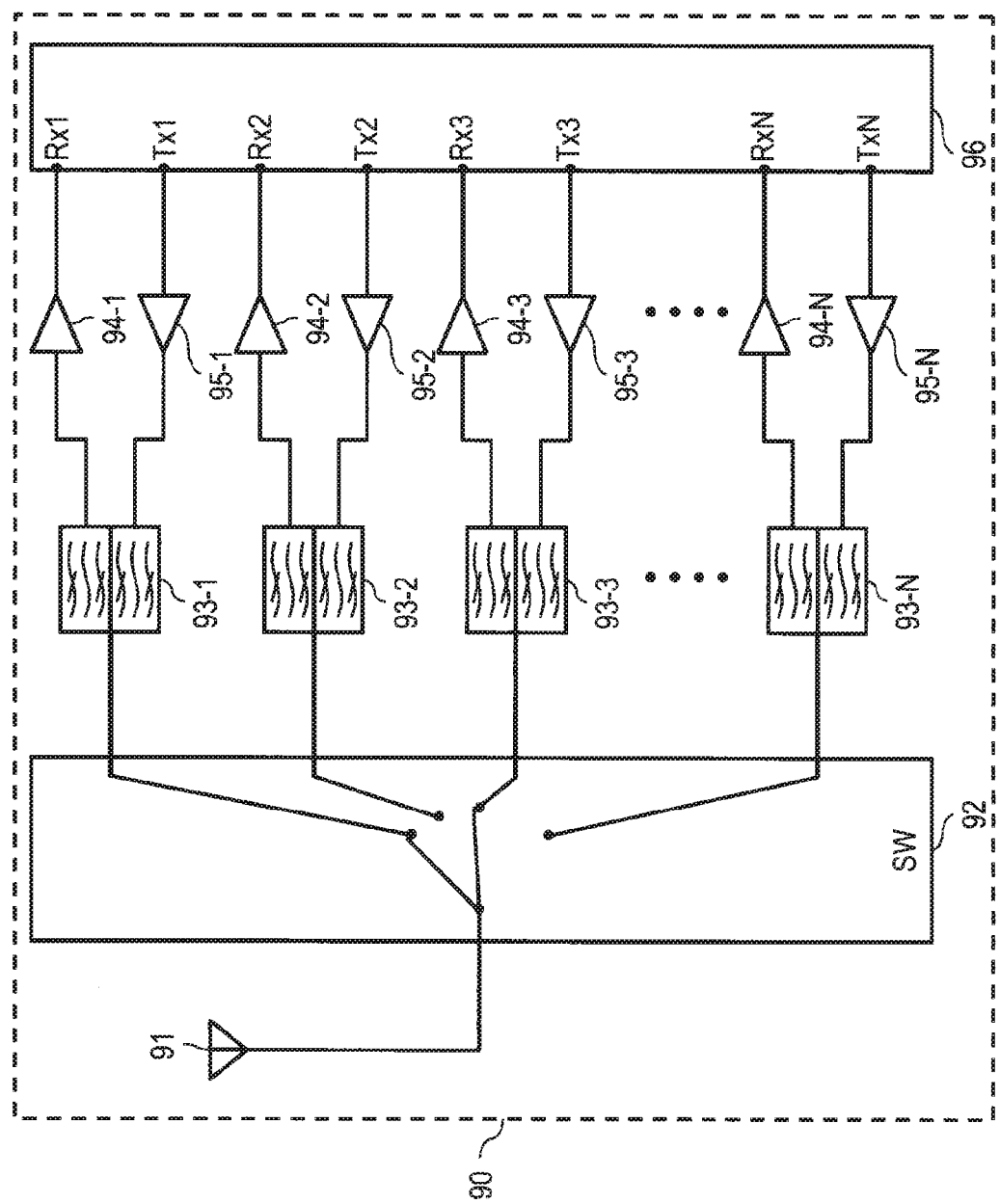
FIG. 1 is a block diagram showing the configuration of a conventional front-end circuit which allows multiband transmission and reception.

Now, an embodiment of the present invention will be described in detail. Elements having identical functions will be denoted by the same reference numerals, and duplicated description of the elements will be omitted.

Figure 2:
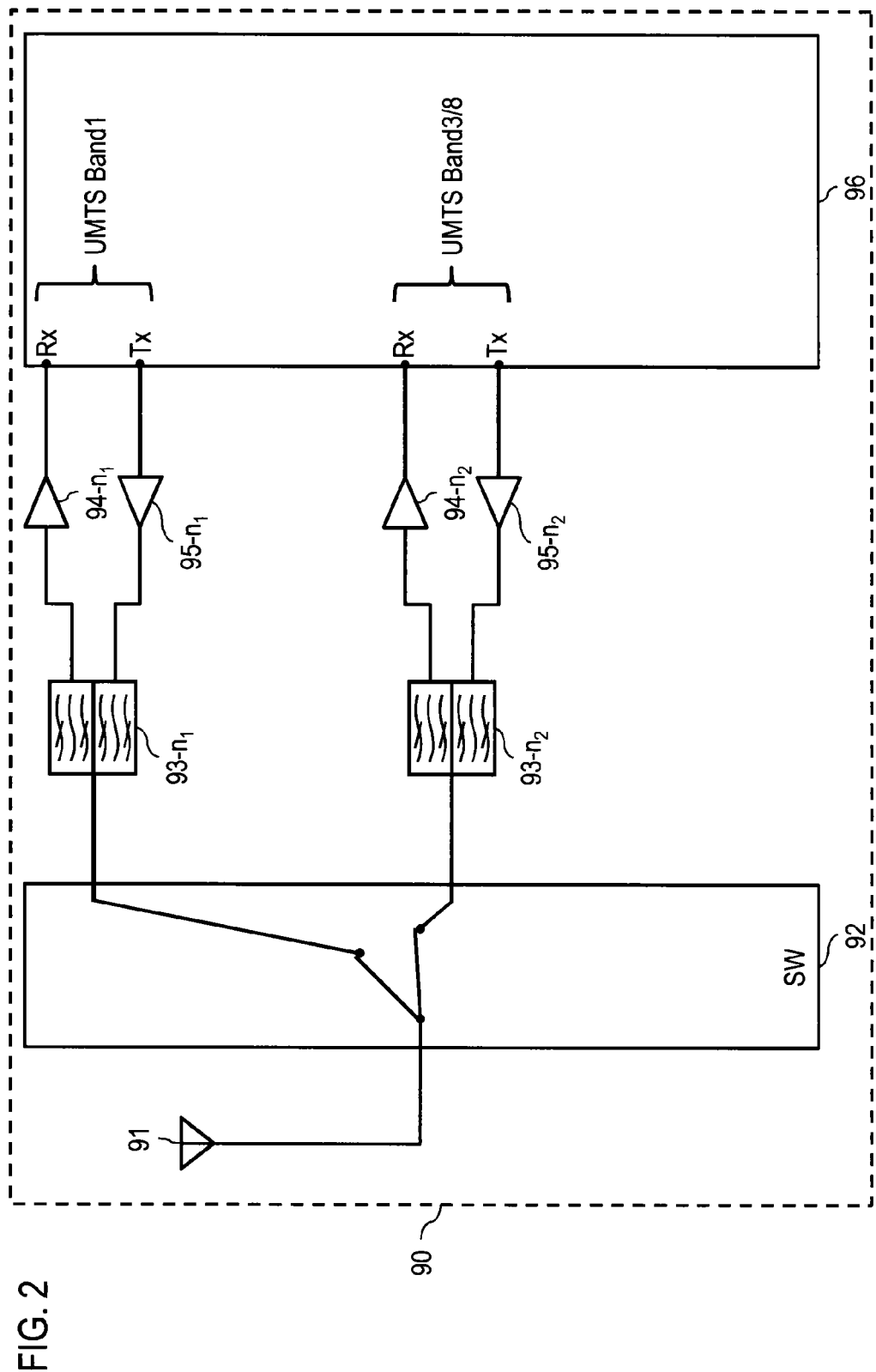
FIG. 2 is a diagram showing an example of frequency allocation in carrier aggregation executed with the conventional front-end circuit.
Figure 3:
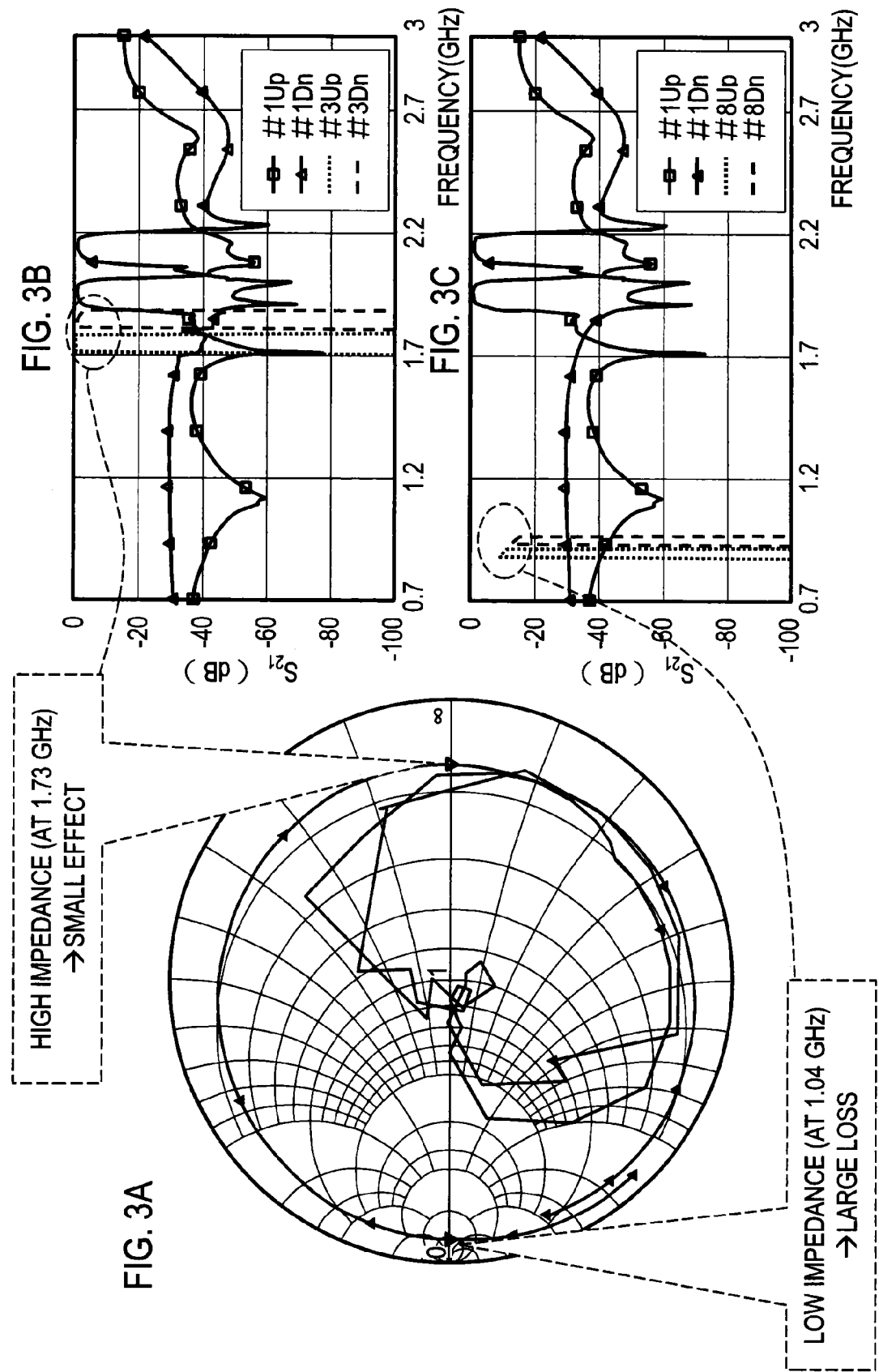
Figure 4:
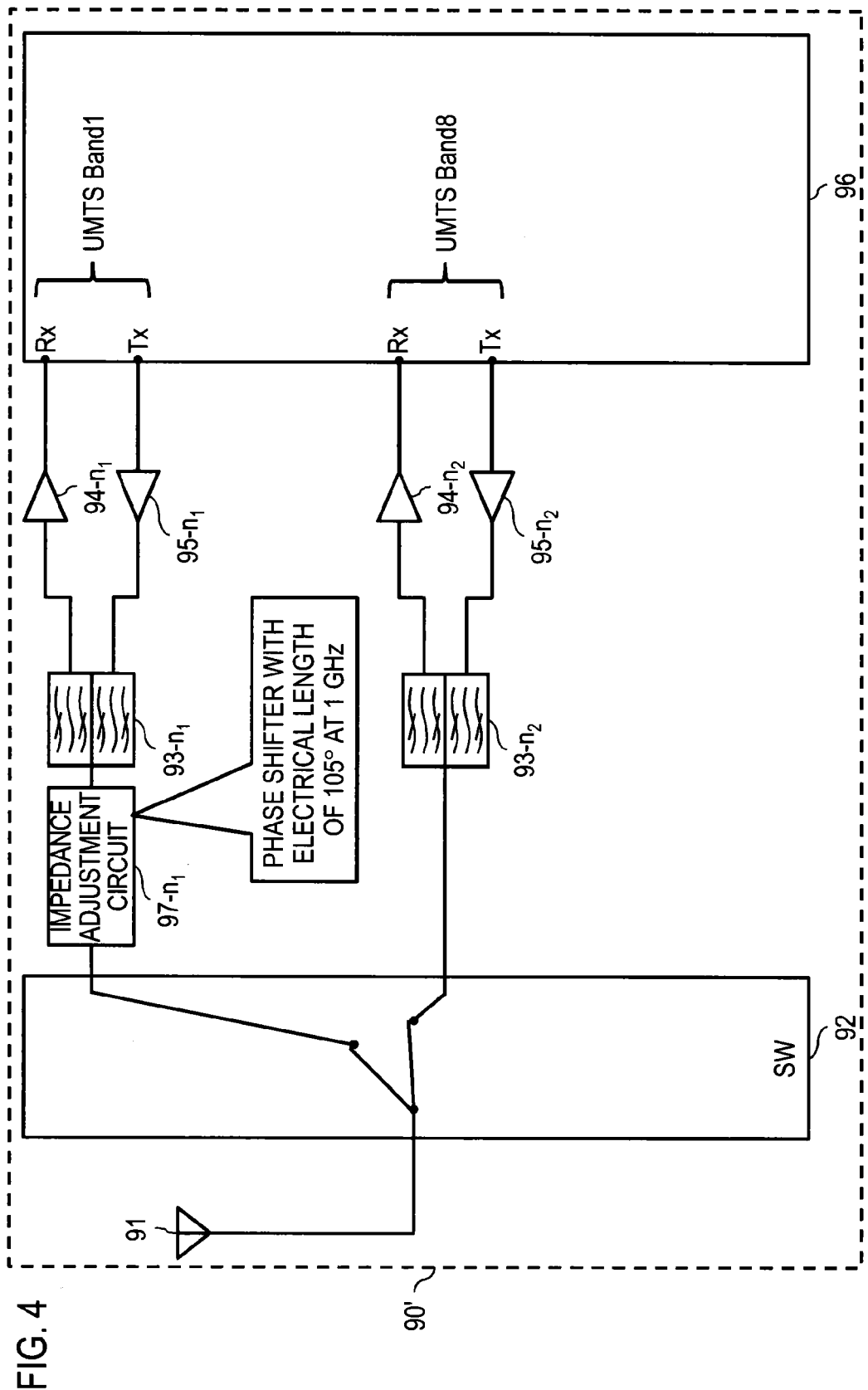
FIG. 4 is a diagram showing an example of frequency allocation in carrier aggregation executed with an improved front-end circuit.
Figure 5B:
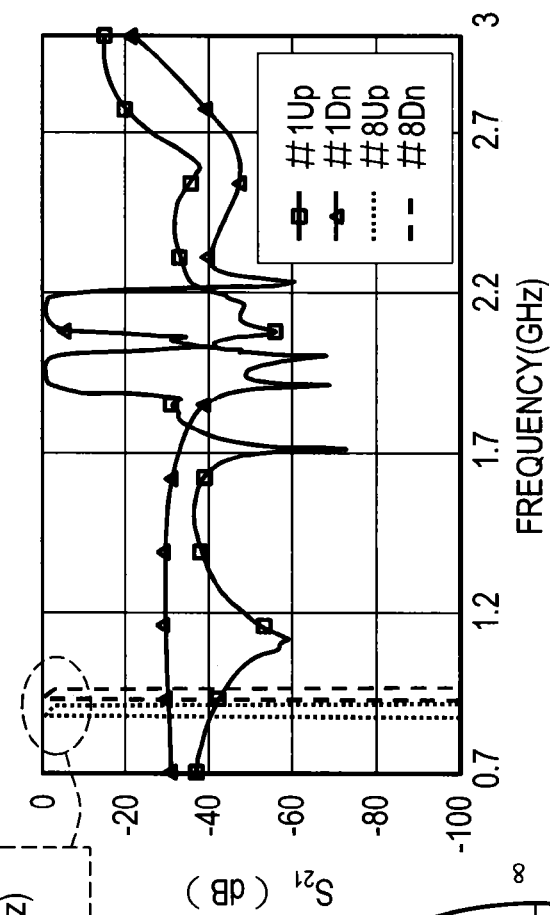
Figure 5A:
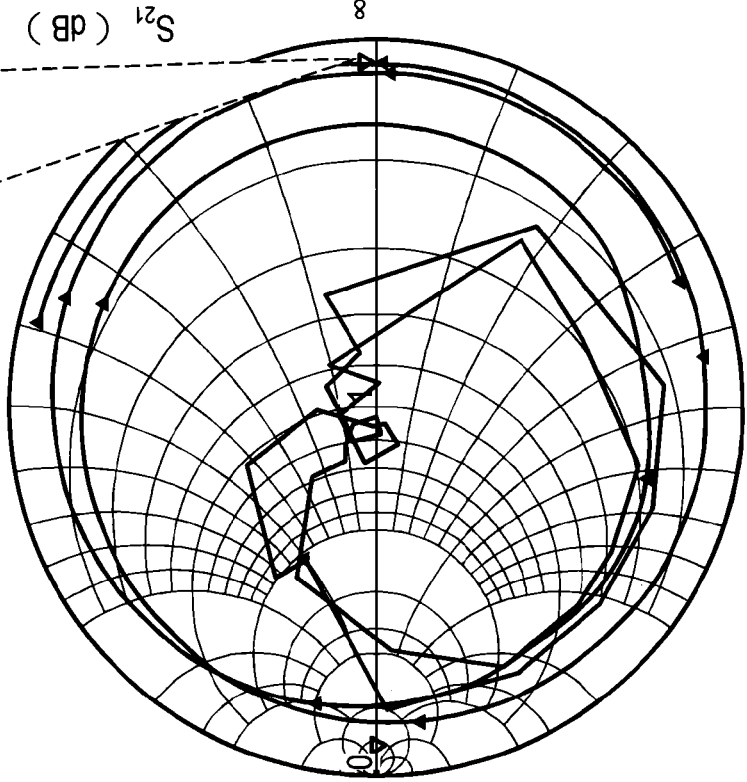

A front-end circuit 90' configured by improving a part of the conventional front-end circuit 90 described earlier will be described with reference to FIG. 4. FIG. 4 is a view showing an example of frequency allocation in carrier aggregation executed with the improved front-end circuit 90'. As shown in FIG. 4, the improved front-end circuit 90' includes an impedance adjustment circuit 97-$n_1$ in addition to the conventional configuration. A terminal of the impedance adjustment circuit 97-$n_1$ on the side of the antenna is connected to one of the changeover contacts of the switch 92, and another terminal of the impedance adjustment circuit 97-$n_1$ on the side of the RFIC is connected to the common terminal of the duplexer 93-$n_1$. As shown in FIG. 2, while the $n_1$-th frequency is always in the UMTS band 1, the $n_2$-th frequency is either in the UMTS band 3 or the UMTS band 8. It is assumed that the impedance adjustment circuit 97-$n_1$ is a transmission line (phase shifter) having an electrical length of 105° at 1 GHz. The transmission characteristics of the duplexers 93-$n_1$ and 93-$n_2$ in this assumption will be described with reference to FIGS. 5A and 5B. FIGS. 5A and 5B are views showing the results of simulation of the transmission characteristics of the duplexers in carrier aggregation with the improved front-end circuit 90'. FIG. 5A is a Smith chart showing the simulated reflection characteristics of the duplexer 93-$n_1$, in which impedance normalized to 50 ohms is set to 1 on the horizontal axis. FIG. 5B is a graph showing the simulated transmission characteristics of the duplexers 93-$n_1$ and 93-$n_2$ (UMTS band 8), with the horizontal axis representing frequency (GHz) and the vertical axis representing the S parameter. As described earlier, the solid line connecting square points represents the transmission characteristics of the transmission filter of the duplexer 93-$n_1$, the solid line connecting triangular points represents the transmission characteristics of the reception filter of the duplexer 93-$n_1$, the dotted line represents the transmission characteristics of the transmission filter of the duplexer 93-$n_2$, and the dashed line represents the transmission characteristics of the reception filter of the duplexer 93-$n_2$.

When the $n_2$-th frequency is in the UMTS band 8, the transmission characteristics of the duplexer 93-$n_2$ (UMTS band 8) show small loss, as indicated by the dotted line and the dashed line in FIG. 5B. The reason is that the input impedance of the duplexer 93-$n_1$ as viewed from the antenna side is high in the frequency band (around 1.0 GHz) near the UMTS band 8, as shown in FIG. 5A, due to the phase shift made by the phase shifter, which prevents the transmission and reception signals in the UMTS band 8 from leaking into the duplexer 93-$n_1$. As shown in FIGS. 4 and 5, the impedance adjustment circuit is effective in preventing a signal from leaking into the duplexer of another circuit.

First Embodiment

In consideration of the description given above, an overview of a front-end circuit which prevents a signal from leaking into another circuit in carrier aggregation according to a first embodiment will be given with reference to FIG. 6.

Figure 6:
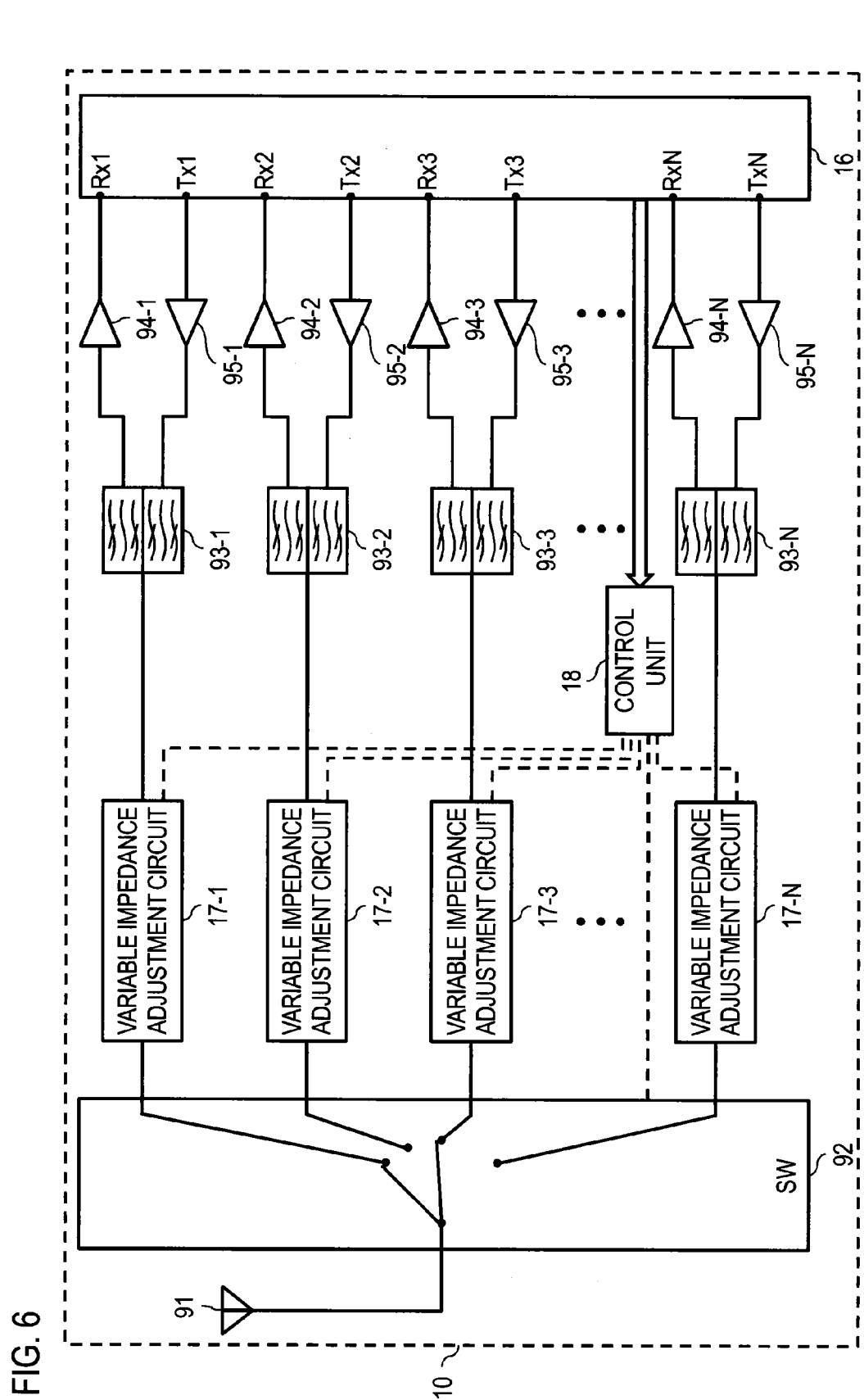
FIG. 6 is a block diagram showing the configuration of a front-end circuit in a first embodiment.
Figure 7:
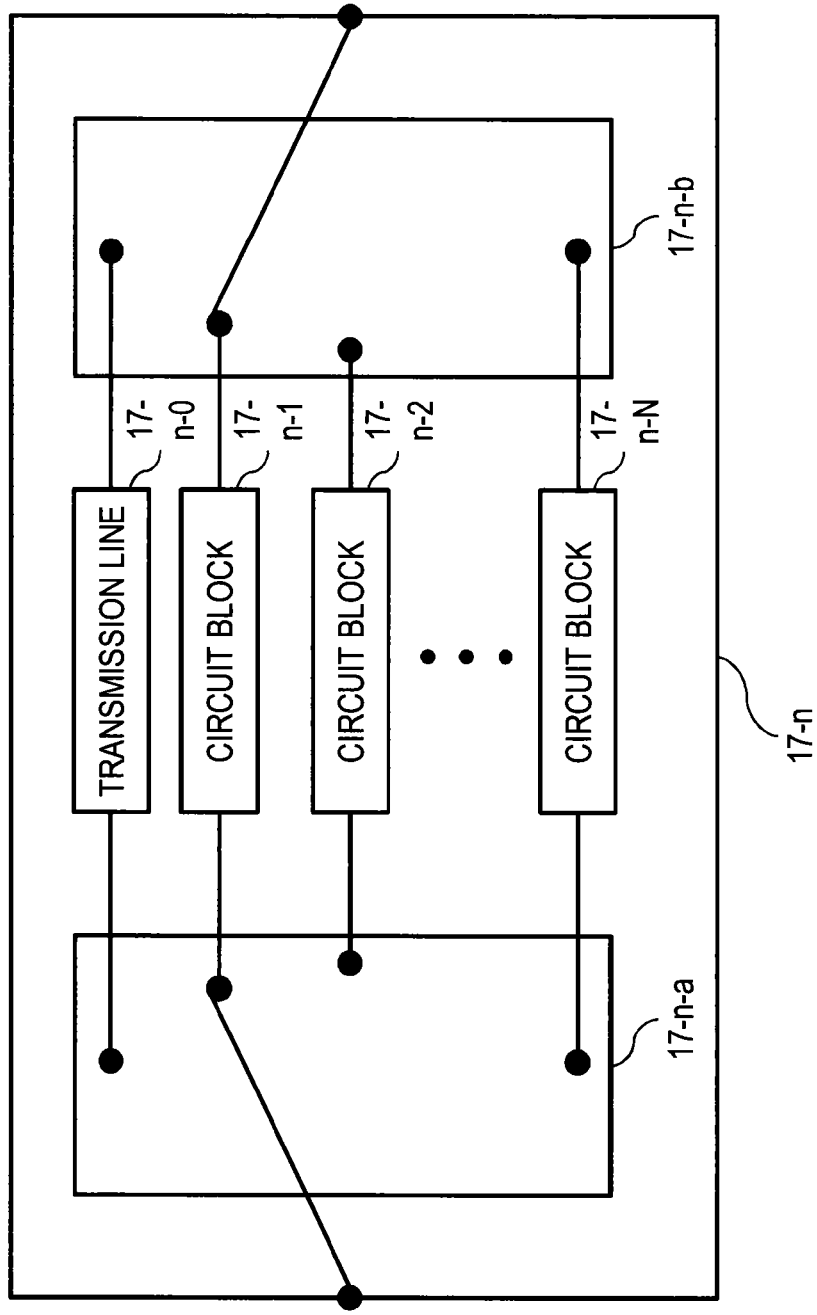
FIG. 7 is a block diagram showing an example configuration of a variable impedance adjustment circuit in the first embodiment.

FIG. 6 is a block diagram showing the configuration of a front-end circuit 10 in this embodiment. As shown in FIG. 6, the front-end circuit 10 in this embodiment includes a transmission and reception antenna 91, a double-pole N-throw switch 92 with its common contact connected to the transmission and reception antenna 91, variable impedance adjustment circuits 17-1 to 17-N having terminals on the antenna side and on the RFIC side, the terminals on the antenna side being connected respectively to the N changeover contacts of the switch 92, duplexers 93-1 to 93-N which receive transmission and reception signals in the first to N-th frequency bands, with their common terminals connected to the terminals on the RFIC side of the variable impedance adjustment circuits 17-1 to 17-N, low-noise amplifiers 94-1 to 94-N which are connected to the reception terminals of the duplexers 93-1 to 93-N and amplify the reception signals in the first to N-th frequency bands, amplifiers 95-1 to 95-N which are connected to the transmission terminals of the duplexers 93-1 to 93-N and amplify the transmission signals in the first to N-th frequency bands, an RFIC 16 which has transmission ports Tx1 to TxN for the first to N-th frequency bands and reception ports Rx1 to RxN for the first to N-th frequency bands, and a control unit 18 which is connected to the variable impedance adjustment circuits 17-1 to 17-N and the switch 92 by control lines (represented by dashed lines in the figure) and which controls switching operations of the variable impedance adjustment circuits 17-1 to 17-N and the switch 92 through the control lines. The control unit 18 is connected to the RFIC 16 by a control signal line (represented by a white arrow in the figure). The control unit 18 receives a control signal from the RFIC 16 through the control signal line. Since the components other than the variable impedance adjustment circuits 17-1 to 17-N, the control unit 18, and the RFIC 16 in the front-end circuit 10 in this embodiment are the same as the components denoted by the same reference numerals in the conventional front-end circuit 90, a description of those components will be omitted. An example configuration of the variable impedance adjustment circuit 17-$n$ (n=1 to N) will be described next with reference to FIG. 7. FIG. 7 is a block diagram showing an example configuration of the variable impedance adjustment circuit 17-$n$ in this embodiment. As shown in FIG. 7, the variable impedance adjustment circuits 17-$n$ (n=1 to N) in this embodiment have the same configuration and include a single-pole (N+1)-throw switch 17-$n$-$a$, a transmission line 17-$n$-0, N circuit blocks 17-$n$-1 to 17-$n$-N, and a single-pole (N+1)-throw switch 17-$n$-$b$. The input and output terminals of the transmission line 17-$n$-0 and the N circuit blocks are connected respectively to the (N+1) changeover contacts of the switches 17-$n$-$a$ and 17-$n$-$b$. The transmission line 17-$n$-0 is shortened as far as possible so that impedance fluctuations caused by the transmission line 17-$n$-0 will be reduced to almost zero. If the control signal, which will be described later, indicates that impedance adjustment is unnecessary, the control unit 18 controls the switches 17-$n$-$a$ and 17-$n$-$b$ to connect the circuit with the transmission line 17-$n$-0 so as to prevent impedance adjustment. The circuit block 17-$n$-1 is configured to increase the input impedance as viewed from the antenna side in the frequency band containing the transmission signal and the reception signal of the first frequency. The circuit blocks 17-$n$-2 to 17-$n$-N are configured to increase the input impedance as viewed from the antenna side in the frequency bands containing the transmission signals and reception signals of the second to N-th frequencies. The circuit blocks 17-$n$-1 to 17-$n$-N may be a phase shifter (transmission line) having an adjusted electrical length, like the impedance adjustment circuit 97-$n_1$, for example. The variable impedance adjustment circuit 17-$n$ in this embodiment is tuned by selecting a circuit block by switching operations of the switches 17-$n$-$a$ and 17-$n$-$b$, but the present invention is not limited to this configuration. The variable impedance adjustment circuit 17-$n$ may also be configured by using a conventional impedance adjustment circuit that is tuned by a combination of a variable capacitor, a coil, a transmission line, and the like. The variable impedance adjustment circuit 17-$n$ in this embodiment can increase the input impedance as viewed from the antenna side in one of the first to N-th frequency bands. Since it is preferred here that impedance adjustment reduce the added insertion loss to about 1 dB or below, if frequency bands selected in carrier aggregation are the p-th and q-th frequency bands (p and q are integers satisfying 1≤p, q≤N, and p≠q), the input impedance as viewed from the antenna side of the variable impedance adjustment circuit 17-$p$ should be larger than or equal to four times the input impedance as viewed from the antenna side of the duplexer 93-$q$, which is a duplexer for the q-th frequency band.

In FIG. 7, the variable impedance adjustment circuit 17-$n$ includes the N circuit blocks respectively corresponding to the N frequency bands, and the variable impedance adjustment circuits 17-$n$ (n=1 to N) can share a single circuit configuration. In the variable impedance adjustment circuit 17-$k$ connected to the duplexer 93-$k$ in the k-th frequency band (k is an integer satisfying 1≤k≤N), since a circuit block for adjusting the impedance in the k-th frequency band is unnecessary, the corresponding circuit block 17-$k$-$k$ may be eliminated. In that case, the variable impedance adjustment circuit 17-$n$ is formed of (N−1) circuit blocks and the transmission line 17-$n$-0.

Figure 8:
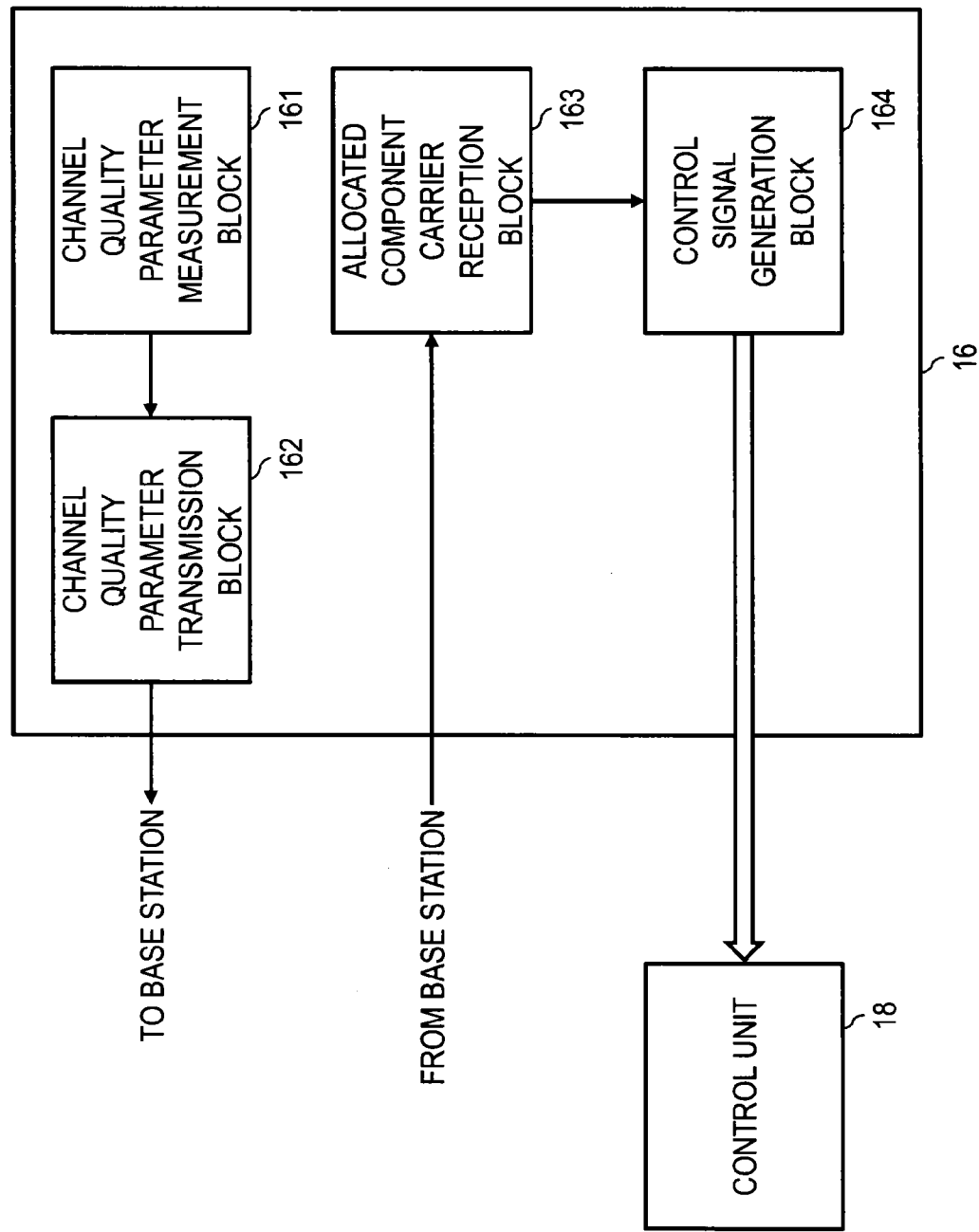
FIG. 8 is a block diagram showing the configuration of a control system provided in an RFIC in the first embodiment.

The configuration and operation of a control system provided in the RFIC 16 in this embodiment will be described with reference to FIGS. 8 and 9. FIG. 8 is a block diagram showing the configuration of the control system provided in the RFIC 16 in this embodiment. FIG. 9 is a flowchart illustrating the operation of the control system provided in the RFIC 16 in this embodiment. The RFIC 16 incorporates a control system for controlling the variable impedance adjustment circuits 17-1 to 17-N and the switch 92 in this embodiment. More specifically, the control system can be configured as embedded software in the RFIC 16. Separate functions of the embedded software can be implemented as shown in FIG. 8. As shown in FIG. 8, the control system in the RFIC 16 includes a channel quality parameter measurement block 161, a channel quality parameter transmission block 162, an allocated component carrier reception block 163, and a control signal generation block 164. After a wireless link is connected to a given cell, the channel quality parameter measurement block 161 receives and decodes information reported from the cell and obtains peripheral cell information. This operation is called cell search. The channel quality parameter measurement block 161 measures the channel quality parameters of all cells for which cell search has been conducted (S161). The channel quality parameter transmission block 162 sends the measured channel quality parameters to a base station (S162). The base station determines component carriers on the basis of the channel quality parameters. In that operation, the base station generally allocates a component carrier of the highest reception level as the primary component carrier and a component carrier of the second highest reception level as the secondary component carrier. The base station sends information reporting the allocated component carriers to the portable terminal. The allocated component carrier reception block 163 provided in the RFIC in this embodiment receives the information reporting the component carriers allocated by the base station (S163). The control signal generation block 164 generates a control signal on the basis of the received information reporting the allocated component carriers and sends the signal to the control unit 18. If the primary component carrier of the allocated component carriers is in the p-th frequency band (p is an integer satisfying 1≤p≤N) and if the secondary component carrier is in the q-th frequency band (q is an integer satisfying 1≤N and p≠q), the control signal controls the switch 92 to connect the changeover contacts connected to the variable impedance adjustment circuits 17-p and 17-q corresponding to the p-th and q-th frequency bands and the common contact. The signal also adjusts the variable impedance adjustment circuit 17-p corresponding to the p-th frequency band so that the input impedance of the q-th frequency band as viewed from the antenna side becomes larger than the impedance in the duplexer 93-q corresponding to the q-th frequency band. The control signal also adjusts the variable impedance adjustment circuit 17-q corresponding to the q-th frequency band so that the input impedance on the p-th frequency band as viewed from the antenna side becomes larger than the impedance in the duplexer 93-p corresponding to the p-th frequency band. In order to reduce the added insertion loss to 1 dB or below, as described above, the impedance of the variable impedance adjustment circuit corresponding to a frequency band should preferably be larger than or equal to four times the impedance of the duplexer corresponding to the frequency band. The control unit 18 executes switching operations of the switch 92 and the variable impedance adjustment circuits 17-p and 17-q in accordance with the control information indicated by the control signal.

The front-end circuit 10 in this embodiment has the tunable (variable) impedance adjustment circuits 17-1 to 17-N in a stage on the antenna side of the duplexers 93-1 to 93-N and, when the p-th and q-th frequency bands are selected in carrier aggregation, the control unit 18 performs switching operations such that the input impedance as viewed from the antenna side of the variable impedance adjustment circuit 17-p(q) corresponding to the p-th (q-th) frequency band increases in the q-th (p-th) frequency band, so that the signal loss caused by leakage into another circuit can be suppressed.

What is claimed is:
1. A front-end circuit comprising:
   a radio frequency integrated circuit;
   a transmission and reception antenna;
   N duplexers in between the radio frequency integrated circuit and the transmission and reception antenna, an i-th duplexer of the N duplexers being for transmission and reception of signals in an i-th frequency band of predetermined first to N-th frequency bands, where N is a predetermined integer greater than or equal to 2 and i is an integer satisfying 1≤i≤N;
   N variable impedance adjustment circuits, an i-th variable impedance adjustment circuit of the N variable impedance adjustment circuits being connected to the i-th duplexer;
   a switch which is connected to the transmission and reception antenna and which selects any two of the N variable impedance adjustment circuits; and
   a control circuit which receives a control signal from the radio frequency integrated circuit, wherein
   the control circuit executes switching operations of the N variable impedance adjustment circuits and the switch in accordance with control information indicated by the control signal, and
   the control signal indicates to, when a p-th frequency band and a q-th frequency band of the predetermined first to N-th frequency bands are selected, where p is an integer satisfying 1≤p≤N, q is an integer satisfying 1≤q≤N and p≠q:
      control the switch to select two variable impedance adjustment circuits corresponding to the p-th frequency band and the q-th frequency band respectively;
      control a selected variable impedance adjustment circuit corresponding to the p-th frequency band to increase input impedance in the q-th frequency band as viewed from the transmission and reception antenna side; and
      control a selected variable impedance adjustment circuit corresponding to the q-th frequency band to increase input impedance in the p-th frequency band as viewed from the transmission and reception antenna side.

2. The front-end circuit according to claim 1, wherein the radio frequency integrated circuit comprises:
   a channel quality parameter measurement block that executes cell search and measures channel quality parameters of all cells for which the cell search has been conducted;
   a channel quality parameter transmission block that sends the measured channel quality parameters to a base station;
   an allocated component carrier reception block that receives information on allocated component carriers from the base station; and
   a control signal generation block that generates a control signal on the basis of the information on the allocated component carriers and sends the control signal to the control circuit,
   wherein the p-th frequency band and the q-th frequency band are specified by the information on the allocated component carriers.

3. An impedance adjustment method for adjusting impedance in a front-end circuit comprising:
   a radio frequency integrated circuit;
   a transmission and reception antenna;
   N duplexers in between the radio frequency integrated circuit and the transmission and reception antenna, an i-th duplexer of the N duplexers being for transmission and reception of signals in an i-th frequency band of predetermined first to N-th frequency bands, where N is a predetermined integer greater than or equal to 2 and i is an integer satisfying 1≤i≤N;
   N variable impedance adjustment circuits, an i-th variable impedance adjustment circuit of the N variable impedance adjustment circuits being connected to the i-th duplexer;
   a switch which is connected to the transmission and reception antenna and which selects any two of the N variable impedance adjustment circuits; and
   a control circuit which receives a control signal from the radio frequency integrated circuit,
   the impedance adjustment method comprising:
   executing cell search and measuring channel quality parameters of all cells for which the cell search has been conducted;
   sending the measured channel quality parameters to a base station;
   receiving information on allocated component carriers from the base station;
   generating the control signal on the basis of the information on the allocated component carriers and sending the control signal to the control circuit; and executing, by the control circuit, switching operations of the N variable impedance adjustment circuits and the switch in accordance with control information indicated by the control signal, wherein, when the allocated component carriers are in a p-th frequency band and a q-th frequency band, where p is an integer satisfying $1 \leq q \leq N$, q is an integer satisfying $1 \leq q \leq N$ and $p \neq q$, the control signal is a signal indicating to:

control the switch to select two variable impedance adjustment circuits corresponding to the p-th frequency band and the q-th frequency band respectively;

control a variable impedance adjustment circuit corresponding to the p-th frequency band to increase input impedance in the q-th frequency band as viewed from the antenna side; and control a variable impedance adjustment circuit corresponding to the q-th frequency band to increase input impedance in the p-th frequency band as viewed from the antenna side.

* * * * *